US011562286B2

(12) United States Patent
Jain et al.

(10) Patent No.: US 11,562,286 B2
(45) Date of Patent: Jan. 24, 2023

(54) METHOD AND SYSTEM FOR IMPLEMENTING MACHINE LEARNING ANALYSIS OF DOCUMENTS FOR CLASSIFYING DOCUMENTS BY ASSOCIATING LABEL VALUES TO THE DOCUMENTS

(71) Applicant: Box, Inc., Redwood City, CA (US)

(72) Inventors: Divya Jain, San Jose, CA (US); Adelbert Chang, Cupertino, CA (US); Lance Co Ting Keh, Tujunga, CA (US); Shivani Rao, Mountain View, CA (US); Sivaramakrishnan Subramanian, San Jose, CA (US)

(73) Assignee: Box, Inc.

( * ) Notice: Subject to any disclaimer, the term of this patent is extended or adjusted under 35 U.S.C. 154(b) by 898 days.

(21) Appl. No.: 15/016,682

(22) Filed: Feb. 5, 2016

(65) Prior Publication Data
US 2016/0232456 A1  Aug. 11, 2016

Related U.S. Application Data

(60) Provisional application No. 62/113,288, filed on Feb. 6, 2015.

(51) Int. Cl.
*G06N 20/00* (2019.01)
*G06F 16/35* (2019.01)

(52) U.S. Cl.
CPC ............ *G06N 20/00* (2019.01); *G06F 16/35* (2019.01)

(58) Field of Classification Search
CPC ...... G06N 99/005; G06N 5/025; G06N 7/005; G06N 20/00; G06K 9/6256; G06K 9/6269

USPC .......................................................... 706/12
See application file for complete search history.

(56) References Cited

U.S. PATENT DOCUMENTS

| | | | |
|---|---|---|---|
| 9,092,802 B1* | 7/2015 | Akella | G06F 40/242 |
| 9,928,295 B2* | 3/2018 | Lambert | G06F 16/355 |
| 10,157,347 B1* | 12/2018 | Kasturi | G06F 16/3326 |
| 10,963,810 B2* | 3/2021 | Dirac | G06N 20/00 |
| 2003/0061201 A1* | 3/2003 | Grefenstette | G06F 17/30011 |
| 2004/0205448 A1* | 10/2004 | Grefenstette | G06F 17/3061 |
| | | | 715/230 |
| 2009/0089078 A1* | 4/2009 | Bursey | H04W 4/70 |
| | | | 705/300 |
| 2012/0296891 A1* | 11/2012 | Rangan | G06F 16/3347 |
| | | | 707/E17.014 |
| 2015/0046779 A1* | 2/2015 | Akselrod | G06F 17/241 |
| | | | 715/202 |
| 2015/0078672 A1* | 3/2015 | Eguro | H04N 13/239 |
| | | | 382/224 |
| 2015/0324459 A1* | 11/2015 | Chhichhia | G06N 7/02 |
| | | | 706/12 |

(Continued)

OTHER PUBLICATIONS

Wei et al.—2010—"Tiara: A Visual Exploratory Text Analytic System"—https://dl.acm.org/citation.cfm?id=1835827 (Year: 2010).*

(Continued)

*Primary Examiner* — Viker A Lamardo
(74) *Attorney, Agent, or Firm* — Vista IP Law Group, LLP

(57) ABSTRACT

Disclosed is an approach for performing auto-classification of documents. A machine learning framework is provided to analyze the document, where labels associated with certain documents can be propagated to other documents.

31 Claims, 22 Drawing Sheets

(56) References Cited

U.S. PATENT DOCUMENTS

| | | | | |
|---|---|---|---|---|
| 2015/0379427 A1* | 12/2015 | Dirac | ................... | G06N 20/00 706/12 |
| 2015/0379428 A1* | 12/2015 | Dirac | ................... | G06N 20/00 706/12 |
| 2015/0379429 A1* | 12/2015 | Lee | ................... | G09B 5/00 706/11 |
| 2016/0034757 A1* | 2/2016 | Chhichhia | ........... | G06K 9/6219 382/206 |
| 2016/0070731 A1* | 3/2016 | Chang | ................... | G06Q 30/00 707/741 |
| 2016/0147891 A1* | 5/2016 | Chhichhia | ........... | G06F 16/986 707/734 |

OTHER PUBLICATIONS

Krishna et al.—"A New Approach to Mining Fuzzy Databases Using Nearest Neighbor Classification by Exploiting Attribute Hierarchies" —2004—https://onlinelibrary.wiley.com/doi/pdf/10.1002/int.20048 (Year: 2004).*

Kalhori, Sharareh R. Niakan. "Improvement the accuracy of six applied classification algorithms through Integrated Supervised and Unsupervised Learning Approach." Journal of Computer and Communications 2.04 (2014): 201.

Ayodele, Taiwo Oladipupo. "Types of machine learning algorithms." New advances in machine learning (2010): 19-48.

Boinee, Praveen. "Insights into machine learning: Data clustering and classification algorithms for astrophysical experiments." (2006).

Kotsiantis, Sotiris B., Ioannis D. Zaharakis, and Panayiotis E. Pintelas. "Machine learning: a review of classification and combining techniques." Artificial Intelligence Review 26.3 (2006): 159-190.

Zhu, Xiaojin, and Zoubin Ghahramanih. "Learning from labeled and unlabeled data with label propagation." (2002).

Lance Co Ting Keh, "Evaluating Apache Spark and Twitter Scalding", Box Blogs, URL:"https://blog.box.com/evaluating-apache-spark-and-twitter-scalding", Jul. 24, 2014.

Fujiwara, Yasuhiro, and Go Irie. "Efficient label propagation." International Conference on Machine Learning. 2014.

Saumitra Srivastav, "Scalable machine learning with apache spark and mlbase", glassbeam.com, URL: https://www.glassbeam.com/blog/scalable-machine-learning-apache-spark-and-mlbase, Jul. 11, 2014.

"Hadoop MapReduce vs. Apache Spark Who Wins the Battle?", dezyre.com, URL: https://www.dezyre.com/article/hadoop-mapreduce-vs-apache-spark-who-wins-the-battle/83, Nov. 12, 2014.

Dean, Jeffrey, and Sanjay Ghemawat. "MapReduce: Simplified data processing on large clusters." (2004).

"Twitter's Scalding—Scala and Hadoop hand in hand", URL:"https://bighadoop.wordpress.com/2012/04/29/twitter-scalding-scala-and-hadoop-hand-in-hand/", Apr. 29, 2012.

David Matuszek, "Understanding the Scala API", University URL:"https://www.cis.upenn.edu/~matuszek/cis554-2011/Pages/scala-api.html", 2011.

* cited by examiner

METHOD AND SYSTEM FOR IMPLEMENTING MACHINE LEARNING ANALYSIS OF DOCUMENTS FOR CLASSIFYING DOCUMENTS BY ASSOCIATING LABEL VALUES TO THE DOCUMENTS

CROSS-REFERENCE TO RELATED APPLICATIONS

The present application claims the benefit of priority to U.S. Provisional Application No. 62/113,288, filed on Feb. 6, 2015, which is hereby incorporated by reference in its entirety.

BACKGROUND

Many enterprises generate vast amounts of data pertaining to or resulting from the operations of the enterprise. These vast amounts of data are stored into collected locations, such as on-premise storage systems or external storage solutions (e.g., vendor-based cloud storage systems). Since the data stored in these storage systems provides a broad scope of content pertaining to the activities of the enterprise, there is often the need at some point in time to review and analyze the data contents. This type of analysis may occur for many reasons.

One possible reason is to identify the confidential and/or legally privileged documents within the set of data. This is particularly useful, for example, in the context of performing e-discovery or transactional diligence activities. Identification of such confidential or privileged documents permits them to be specially handled and/or withheld from production to a third party.

Another reason to analyze the data is to make recommendations about the data contents. For example, when a user has a usage history with certain documents or has chosen to access certain specified documents of interest, it would be quite beneficial to allow the system to recommend other documents that are "similar enough" such that other documents are identified that should also be of interest to the user. The user can then directly access these other documents with some confidence that they would be of particular pertinence to that user.

Existing technologies to perform these analysis activities suffer from significant drawbacks. For example, one common approach is to drive the analysis using a set of policies and rules, where search terms are used in various Boolean AND and OR combinations to identify documents of interest. The problem with this approach is that it is very difficult to properly tune the policies and rules such that they have an acceptable, correct, and/or efficient scope. If the policies and rules are too restrictive, then the necessary materials are not properly identified. If the policies and rules are too non-restrictive, then there may be an excessive number of false positives in the analysis results.

Another approach is to employ certain learning algorithms to create a "classifier" for analyzing the data. The classifier works by obtaining a large number of existing documents that have already been tagged in some manner, and then having the classifier train from those documents to learn how to identify similar documents of interest. The problem with this approach is that it requires a large body of training documents for the classified to operate properly. In many cases, such training materials just do not exist. In other cases, the enterprise may choose not to make such training materials available to third party tools, e.g., where the enterprise chooses to withhold such materials from a cloud-based storage service provider or from an e-discovery vendor.

These problems are further exacerbated by the sheer volume of the data that is typically collected by modern enterprise organizations. Given the large number of documents and materials to be reviewed for a typical modern enterprise, it is becoming more and more difficult to effectively analyze the collected data.

Therefore, there is a need for an improved approach to implement analyses of large data collections.

SUMMARY

Embodiments of the present invention provide an approach for performing auto-classification of documents. According to some embodiments, a machine learning framework is provided to analyze the document, where labels associated with certain documents can be propagated to other documents. The inventive approach therefore does not rely upon and/or does not use a large (or any) existing body of training materials, but still allows for improvements in analysis results using user feedback.

Other additional objects, features, and advantages of the invention are described in the detailed description, figures, and claims.

BRIEF DESCRIPTION OF FIGURES

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the invention or as a limitation on the scope of the invention.

FIGS. 9B-1 and 9B-2 provide diagrams of illustrative systems according to some embodiments of the invention.

DETAILED DESCRIPTION

As noted above, vast amounts of data may be generated and stored pertaining or resulting from the operation of an enterprise. These data are then stored into collected locations, which can be reviewed at a later time period if there is a need to analyze the data content for that enterprise. Embodiments of the present invention provide an approach for performing auto-classification of an enterprise's data content, where a machine-learning framework is provided to analyze documents. Labels associated with documents can then be auto-propagated to other documents.

While the below description may describe the invention by way of illustration with respect to a specific use case for identifying confidential data, it is noted that the invention is not limited in its scope only to this specific use case, and indeed is applicable to wide range of different applications. Similarly, the below description may describe the invention by way of illustration with respect to a cloud-based storage system. However, it is noted that the inventive concepts disclosed herein are not limited only to cloud-based storage systems, and are applicable to data stored in any type of storage architecture.

Figure 1:
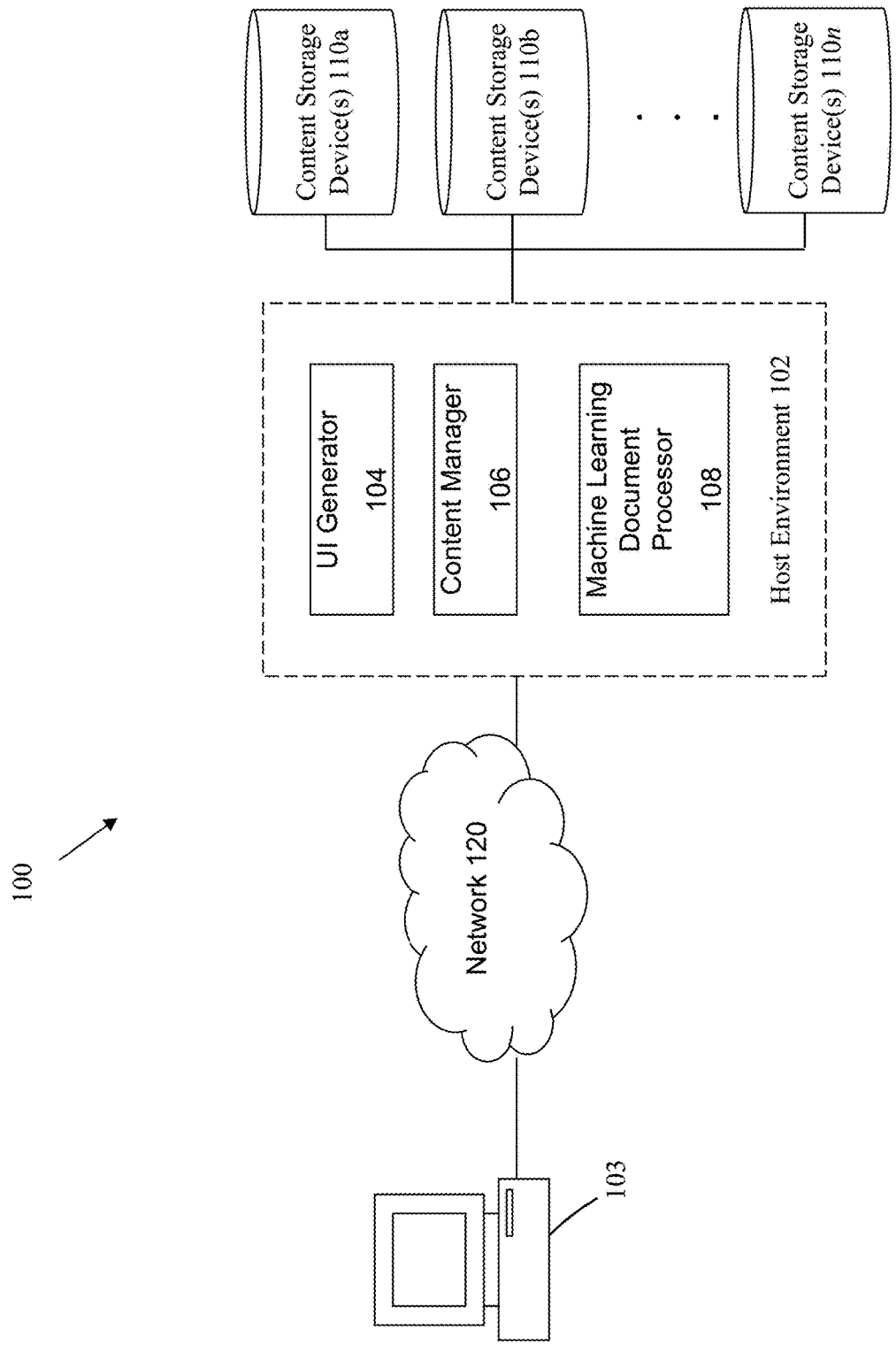
FIG. 1 illustrates an example system for performing auto-classification of data according to some embodiments of the invention.

FIG. 1 illustrates an example system 100 for performing auto-classification of data according to some embodiments of the invention. System 100 includes a cloud service/platform, collaboration and/or cloud storage service with capabilities that facilitate collaboration among users as well as enable utilization of content in the workspace. The system 100 therefore includes a host environment 102 that in some embodiments is embodied as a cloud-based and/or SaaS-based (software as a service) storage management architecture. This means that host environment 102 is capable of servicing storage functionality as a service on a hosted platform, such that each customer that needs the service does not need to individually install and configure the service components on the customer's own network. The host environment 102 is capable of providing storage services to multiple separate customers, and can be scaled to service any number of customers.

The host environment 102 includes any number of one or more server components, including for example, a content manager 106, a machine learning document processor 108, and a user interface generator mechanism 104. The components within the host environment 102 may all be located on a single server, or may be located on multiple different physical servers.

The content manager 106 is used to manage data content stored on one or more content storage devices 110a, 110b, . . . 110n. The content storage devices comprise any combination of hardware and software that allows for ready access to the data that is located at the content storage device. For example, the content storage device could be implemented as computer memory operatively managed by an operating system, hard disk drives, solid state drives, networked attached storage, storage area networks, cloud-based storage, or any other type of storage architecture that is capable of storing data. The data in the content storage device can be implemented as any type of data objects and/or files.

The machine learning document processor 108 is provided to perform classifications of documents according to its data content. A more detailed description of the machine learning document processor 108 is provided below.

The user interface generator mechanism 104 generates the UI to display the classification and analysis results, and to allow the user to interact with the system. For example, the user may interface with the system to provide labels for documents and to accept or reject recommendations from the system.

The system 100 may include one or more users at one or more user stations 103 that use the system 100 across network 120 to operate and interact with the host server 102. The user station 103 comprises any type of computing station that may be used to operate or interface with the system 100. Examples of such user stations include, for example, workstations, personal computers, mobile devices, or remote computing terminals. The user station comprises a display device, such as a display monitor, for displaying a user interface to users at the user station. The user station also comprises one or more input devices for the user to provide operational control over the activities of the system 100, such as a mouse or keyboard to manipulate a pointing object in a graphical user interface to generate user inputs.

Figure 2:
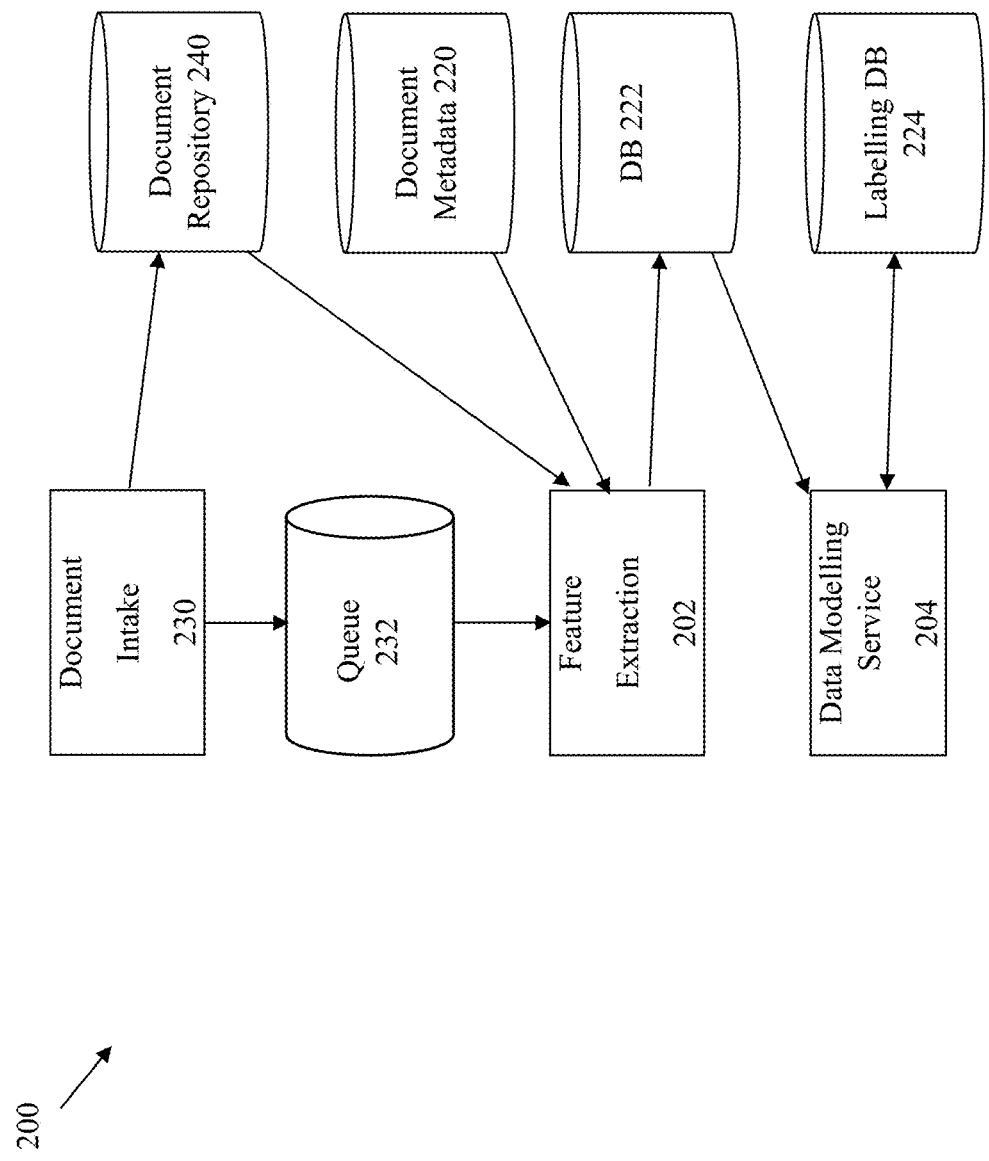
FIG. 2 shows a high-level diagram of the machine learning framework according to some embodiments of the invention.

FIG. 2 shows a high-level diagram of the machine-learning framework 200 according to some embodiments of the invention. A document intake mechanism 230 is provided to receive documents to be processed in the system and stored into document repository 240. As new and/or modified documents are received in the system, an "event" is created that corresponds to the new document. Therefore, the document intake mechanism 230 may include an event dispatcher to process the events associated with receipt of the documents. A rule manager comprising a set of rules may be provided to perform event handling for the documents. A job manager can then be used to place the work pertaining to the documents to be processed into a queue 232.

Other types of events may also result in creation of work to be placed into the queue 232, even in the absence of new and/or modified documents. For example, there may be a need to perform classification of existing documents upon certain circumstances, e.g., where feedback has been provided from the user for previous classification recommendations or where user-provided classifications have been provided that may result in better classifications of the existing documents.

A feature extraction engine 202 analyzes the documents identified in queue 232 to extract feature information pertinent to analysis of the documents and/or document metadata, e.g., to generate a vector value for each document and/or its metadata. These vector values provide a deterministic numerical/symbolic way to quantify a value for each document so that they can be automatically analyzed and compared to one another. Any suitable approach can be used to generate vector of feature values for the documents. One possible approach is to create a term-frequency vector representing the documents based upon the content of the document. For the purposes of illustration, the below description is provided in the context of "vectors" being generated at 202 for the feature extraction step. It is noted however, that the invention is not limited only to vectors, and is applicable to other types of features being extracted at 202 and then modelled in the later steps.

Other possible approaches may also be used, including a review of metadata about the document from a metadata repository 220. Such metadata may include, for example, author information, document/folder ID information, filenames, creation date information, and modification date information. The vector data that is generated can be stored into a database 222.

A data modeling service 204 uses the vector data to model the document data, and to then automatically classify the documents. Clustering may be employed to form groups within the document data, or a similarly matrix may be computed between documents. Label propagation may then be performed to apply or suggest labels to the analyzed documents. The label data may be accessed from a label database 224.

Figure 3:
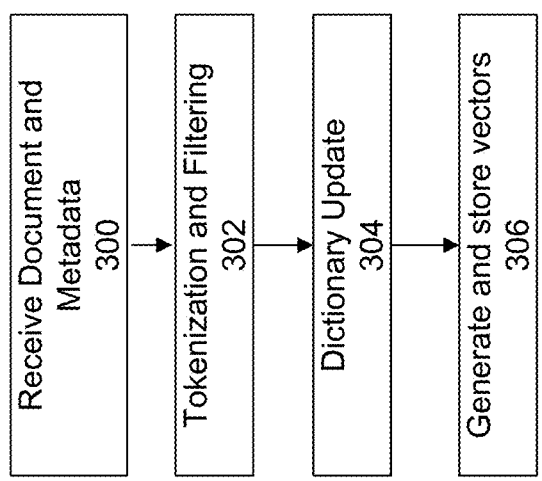
FIG. 3 shows a flowchart of the actions performed by the Feature Extraction Engine according to some embodiments of the invention.

FIG. 3 shows a flowchart of the actions performed by the feature extraction engine according to some embodiments of the invention. This example flow pertains to an approach that performs term-frequency analysis. At 300, the document to be analyzed is received. In some embodiments, metadata about that document is also received.

At 302, tokenization and filtering are performed upon the document. Tokenization is the process of breaking the document into a set of tokens. Stemming, normalization, and root-form analysis may also be performed at this point. Data filtering, such as stop word removal, is used to remove certain non-relevant terms, such as "a", "the", etc.

Next, an update is provided to a dictionary at 304, based upon the tokens identified in the document. Each identified term that is not already in the dictionary will be added to the dictionary at this point.

At 306, a term-frequency vector is generated for the document under analysis. The vector takes into account each of the relevant terms in the document, along with the frequency at which that term exists in the document. The vector data is then stored for the document.

Figure 4A:
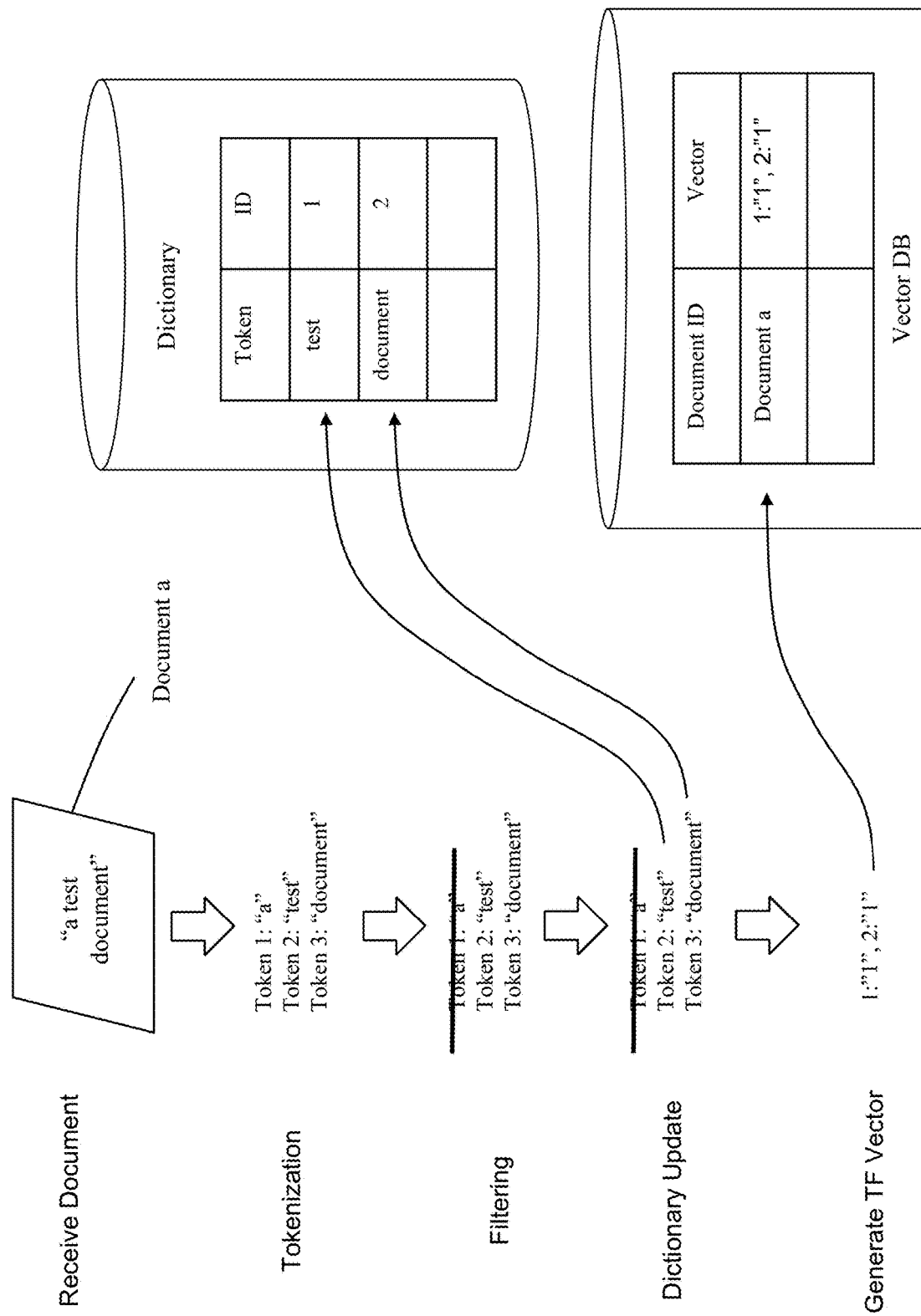
FIGS. 4A and 4B illustrate Term-Frequency (tf) processing of documents.

FIG. 4A illustrates this process applied to an example document a. Document a includes the following data content:

"a test document"

The first action to be performed is to tokenize the document. Here the document includes three tokens, which are:

"a"

"test"

"document"

The next action is to perform data filtering. In the current document, the term "a" is an example of the type of a likely irrelevant term that should be filtered out. This leaves the following terms:

"test"

"document"

At this point, the dictionary is checked to see if any of these terms already exist in the dictionary. If not, then each newly identified term is placed into the dictionary. Each term is also assigned to an ID value. Here, the term "test" is placed into the dictionary and is assigned an ID value of "1". The term "document" is also placed into the dictionary, and is assigned an ID value of "2".

A term-frequency representation of the document is created by identifying the frequency at which terms appear within the document. Here, document a include one appearance of the term "test" having ID value of "1" and one appearance of the term "document" having an ID value of "2". Therefore, the vector value for document a can be represented as 1:"1", 2:"1".

Figure 4B:
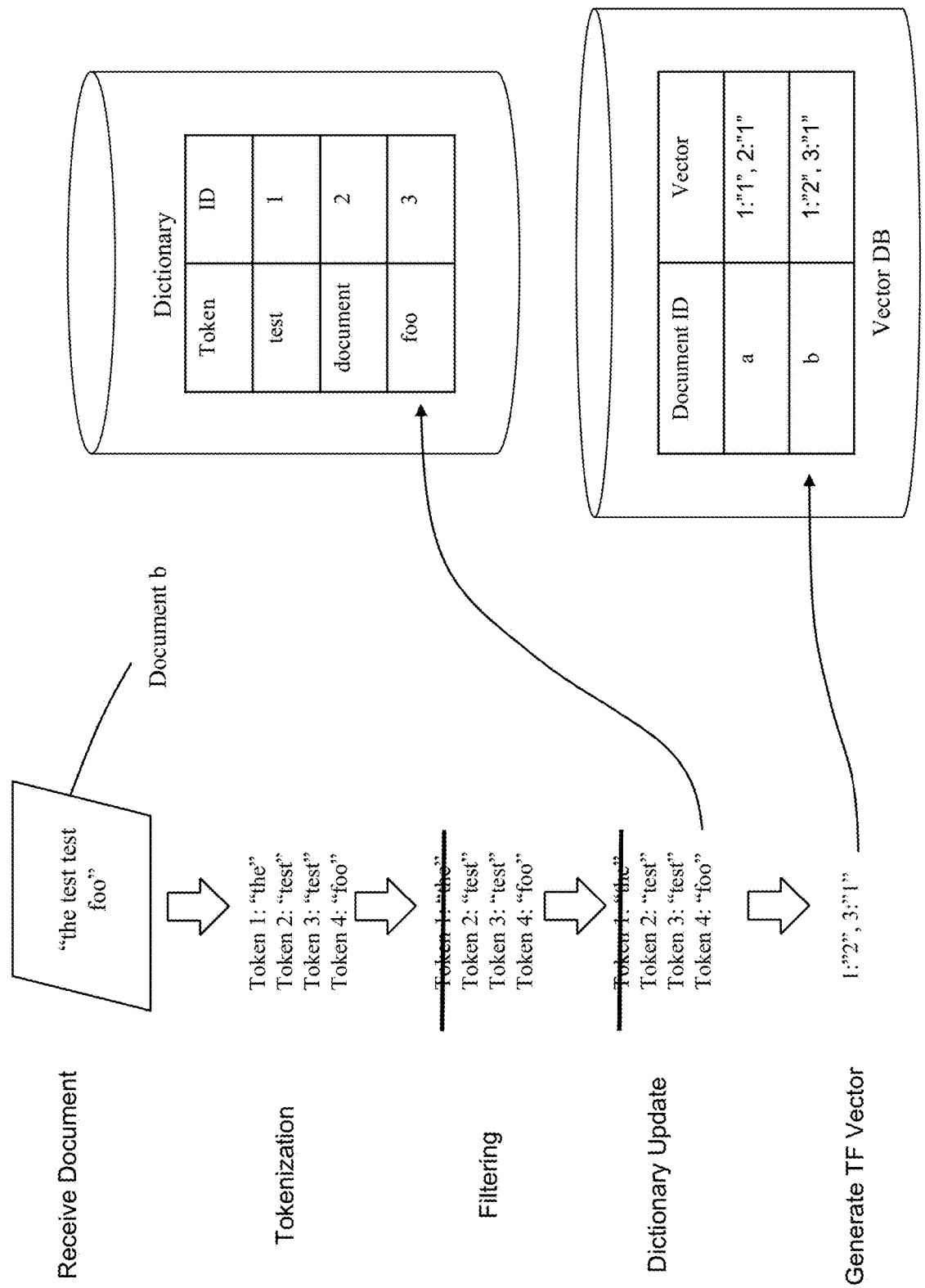

FIG. 4B illustrates this process applied to another example document b. Document b includes the following data content:

"the test test foo"

As before, the first action to be performed is to tokenize the document. Here the document includes four tokens, which are:

"the"

"test"

"test"

"foo"

The next action is to perform data filtering. In the current document, the term "the" is an example of a likely irrelevant term that should be filtered out. This leaves the following terms:

"test"

"test"

"foo"

At this point, the dictionary is checked to see if any of these terms already exist in the dictionary. If not, then each newly identified term is placed into the dictionary. Here, the term "test" already exists in the dictionary because the previously processed document a included an occurrence of this term. Therefore, a new entry for the term "test" does not need to be created for the dictionary.

However, the term "foo" does not yet exist in the dictionary. Therefore, a new entry is created in the dictionary for the "foo" term. A new ID value is also assigned to be associated with the newly added "foo" term. Here, the term "foo" is placed into the dictionary and is assigned an ID value of "3".

A term-frequency representation of the document b is created by identifying the frequency at which terms appear within the document. Document b include two appearances of the term "test" having ID value of "1" and one appearance of the term "foo" having an ID value of "3". Therefore, the vector value for document b can be represented as 1:"2", 3:"1".

Figure 5:
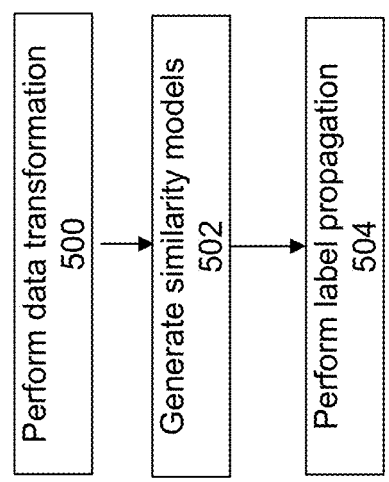
FIG. 5 shows a flowchart of actions performed by the modelling service according to some embodiments of the invention.

FIG. 5 shows a flowchart of actions performed by the modelling service according to some embodiments of the invention. At 500, one or more data transformations may be performed upon the data of interest. For example consider the data in the dictionary pertaining to terms within documents and their associated ID values. In some approaches, the dictionary may be created on a system-wide basis for documents from multiple enterprises. In this scenario, it is possible that the terms of interest to a first enterprise may not necessarily overlap with the terms of interest to a second enterprise. As a result, the terms of interest for a particular enterprise under analysis may only sparsely populate the space within the dictionary, leaving gaps between relevant terms.

This may occur when the ID value of a first term of interest in the dictionary is "1" and the next subsequent ID value for a second term of interest is "10000", leaving a very large gap between these two ID values for the enterprise. To reduce memory usage and computational expense for certain matrix operations, these ID values can be transformed into sequential ID values for purposes of the modeling analysis, e.g., where the original ID for the first terms is "1", the transformed ID value stays as "1". However, for the second term, the original ID value of "10000" is transformed into the next sequential ID value of "2".

At 502, similarity models are created for the multiple documents. This action generates a graph having a representation for each document, where the graph location for each document node is based upon the vector value for that document. Edges are identified and created between the document nodes to represent the distance between the nodes.

Label propagation is then performed at 504. This action identifies the neighborhoods that correspond to each document node, and attempts to identify the relevant label(s) that should be associated with one or more documents within the neighborhood. By identifying similar-enough documents, the labels can then be automatically propagated and/or recommended to be propagated to the other documents.

Figure 6A:
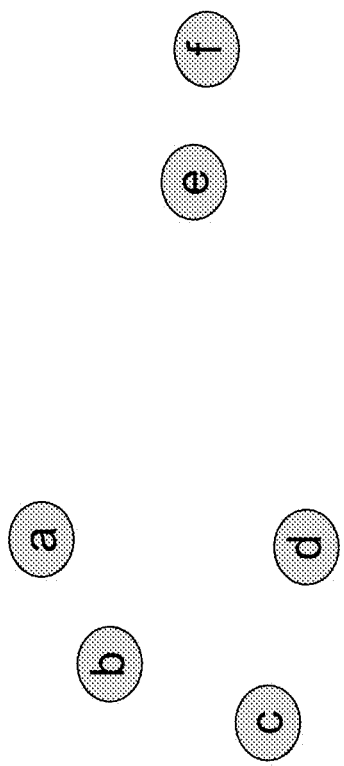
FIGS. 6A-6E illustrate the modelling process.
Figure 6B:
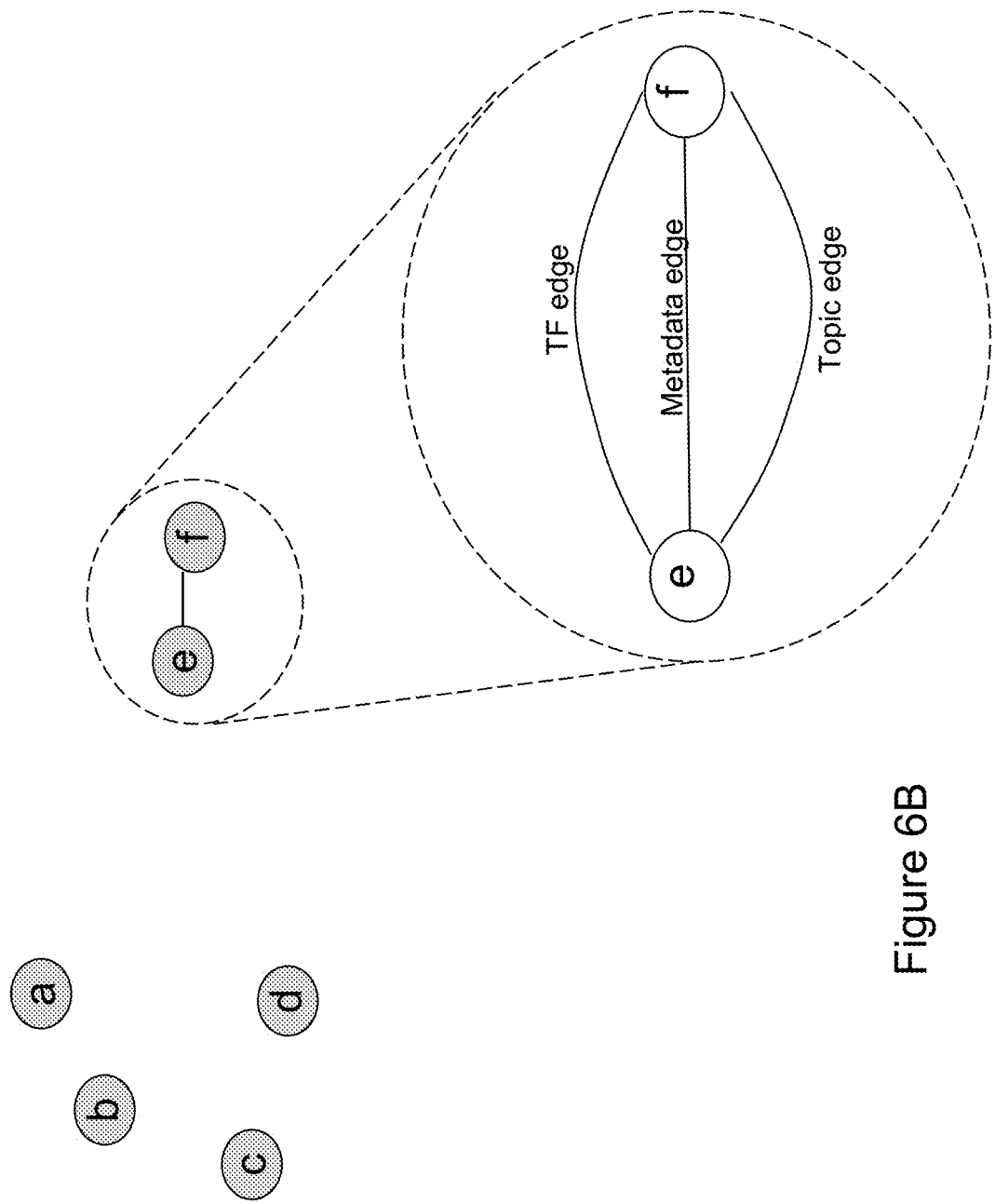

To illustrate the modelling process, consider the set of document nodes shown in FIG. 6A (nodes a, b, c, d, e, and f). Each of these document nodes corresponds to a vector value that was derived for an underlying As shown in FIG. 6B, an edge can be placed between any two of the nodes to represent the similarity distance between the two nodes. Any number of edges can be placed between the nodes. For example, some embodiments may create only a single edge between two nodes. Alternatively, multi-edged graphs can be created that includes different types of edges between any two nodes. Edges can be created on text content (e.g., based upon term-frequency). Edges can also be based upon metadata, document topic, document usages, etc.

Figure 6C:
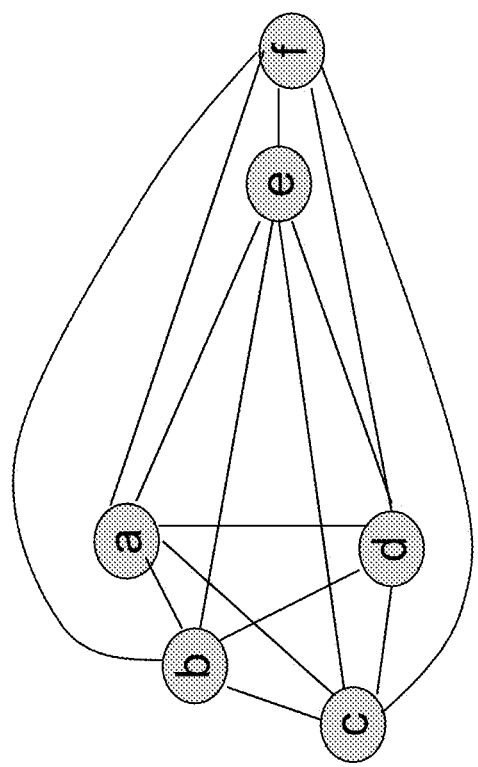
Figure 6D:
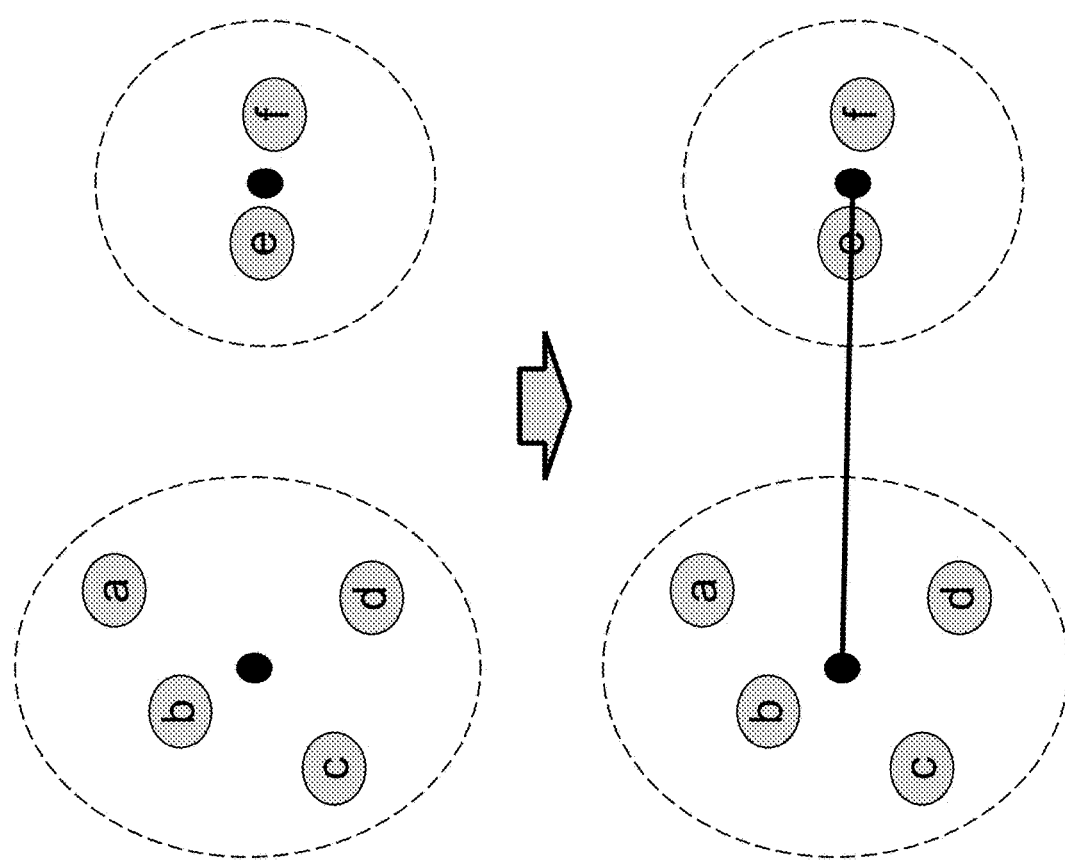
Figure 6E:
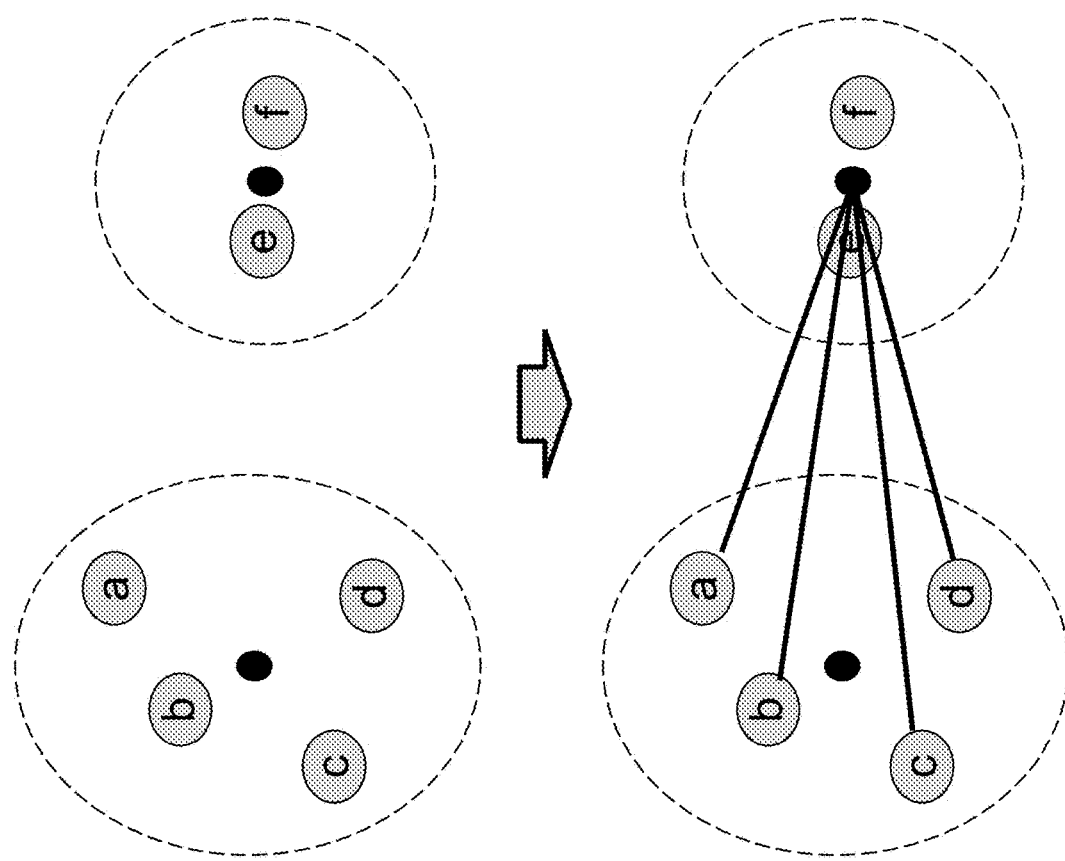

In some embodiments, each and every node in the graph is connected to every other node. This is the approach shown in FIG. 6C to create a fully connected graph. In an alternate embodiment, a clustering algorithm is applied to identify the centroid for each cluster, so that there does not need to have an edge between every node. Instead, edges between clusters can be formed from the cluster centroid to another centroid, e.g., as shown in FIG. 6D. As shown in FIG. 6E, the edges can also be formed from a cluster centroid to the individual nodes in other clusters.

Figure 7:
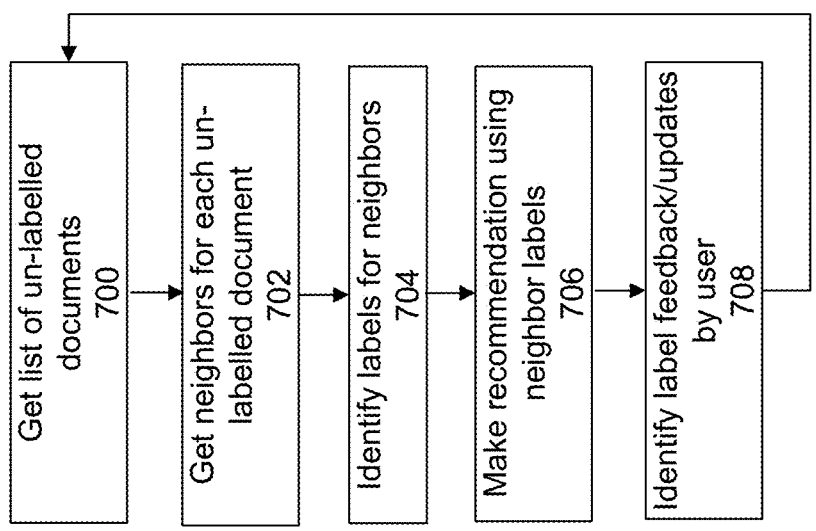
FIG. 7 shows a flowchart of a process for performing label propagation according to some embodiments of the invention.

Next, label propagation/recommendation is performed for the documents represented in the model. FIG. 7 shows a flowchart of a process for performing label propagation according to some embodiments of the invention. At 700, a list is obtained of the currently un-labelled documents.

At 702, neighbors are identified for each of the un-labelled documents. Any suitable clustering/scoring approach can be taken to identify the neighbor documents. For example, a threshold distance can be established for the analysis, and any nodes within the threshold distance would be considered neighbors. Any number of edges may be considered when performing scoring to identify neighbors. In some embodiments, weighting may be applied to increase/decrease the impact of certain types of edges for certain types of analyses.

At 704, identification is made of neighbor documents that have already been labelled. It is possible that some of the documents have already been labelled, e.g., by users that have manually labelled one or more documents already, by prior auto-labelling processes, and/or by users that have accepted prior labelling recommendations. These previously labeled documents are identified in this step.

Recommendations may then be provided at 706. In some embodiments, if a majority of the neighbor labels has a certain label value, then that label value is recommended for the node under examination. In an alternate embodiment, any conflict between neighbor labels would result in no recommendation being made for the node. Similarly, in some embodiments, if there is no majority of the neighbor labels that have a certain label value, then no label value would be recommended for the node under examination. Alternatively, a recommendation can be provided consistent with the label for the closest node that is already labeled.

At a later point in time, label feedback may be provided by the user at 708. This may occur, for example, when the user either accepts or rejects the label recommendation. At this point, the next iteration of the label propagation process can use that information to tune the time similar nodes are processed or label propagation.

Figure 8A:
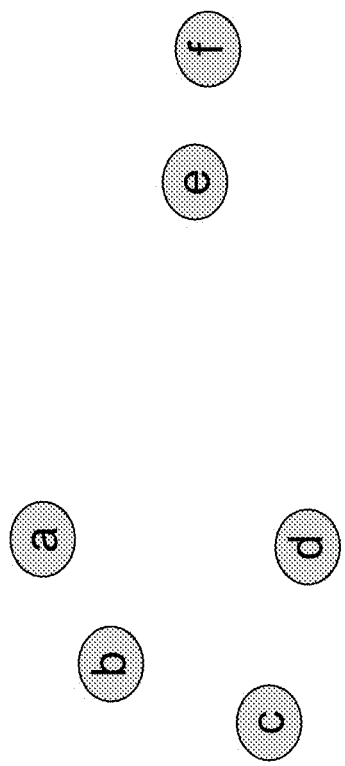
FIGS. 8A through 8C-4 illustrate label propagation.
Figure 8B:
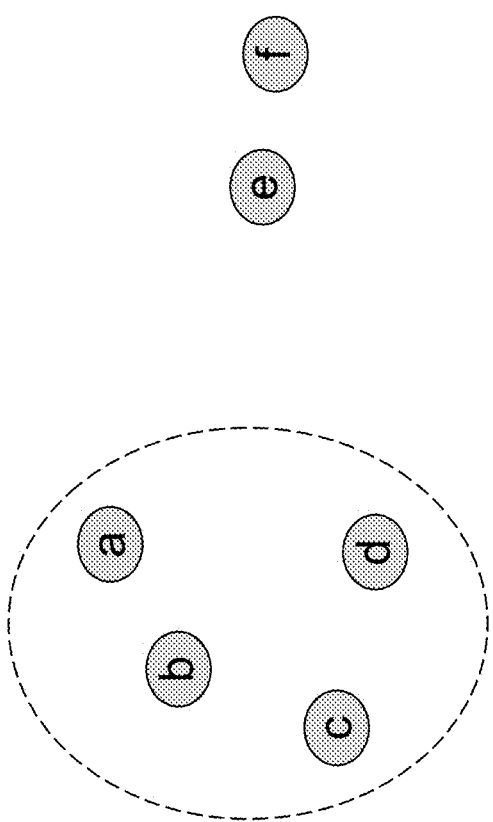

To illustrate this label propagation process, FIG. 8A once again shows the set of document nodes a, b, c, d, e, and f Assume that document "a" is an un-labelled document. As shown in FIG. 8B, clustering may be performed to identify the neighbor nodes for document a. Here, the neighbors for document a are documents b, c, and d.

Figure 8C:
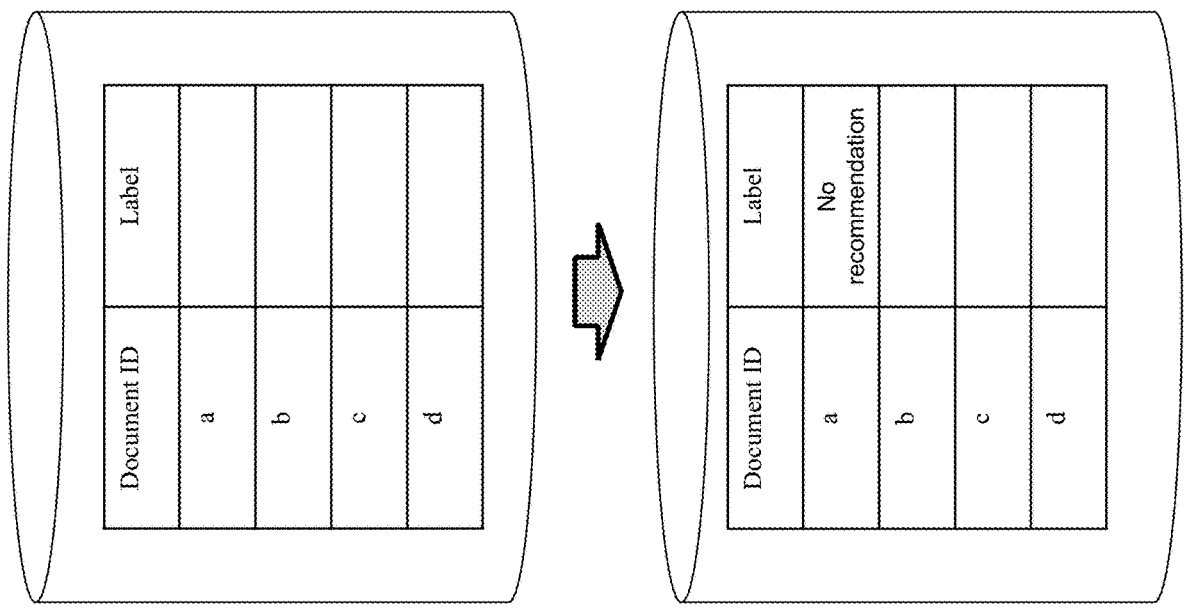
Figure 1:
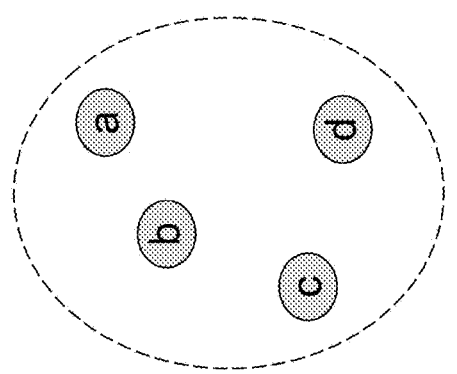
Figure 8C:
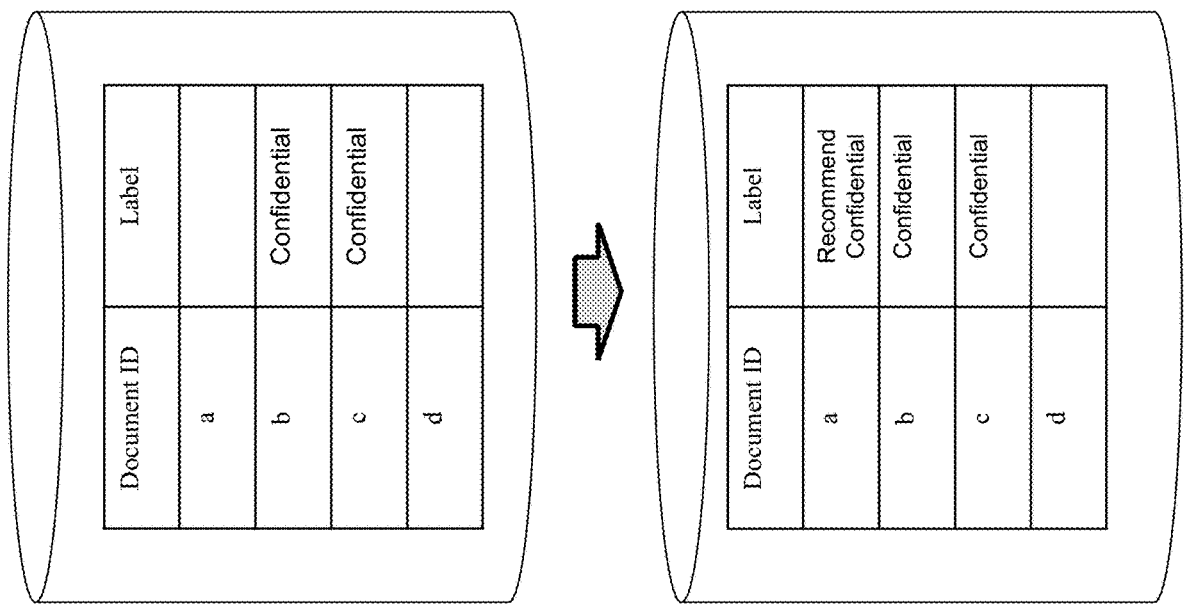
Figure 2:
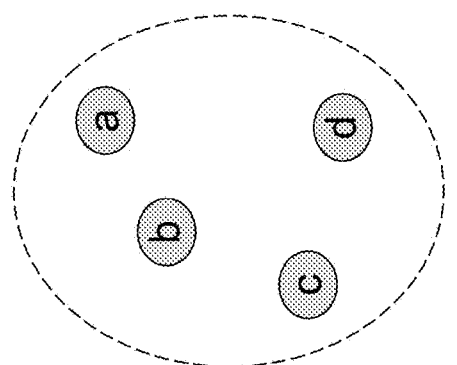
Figure 8C:
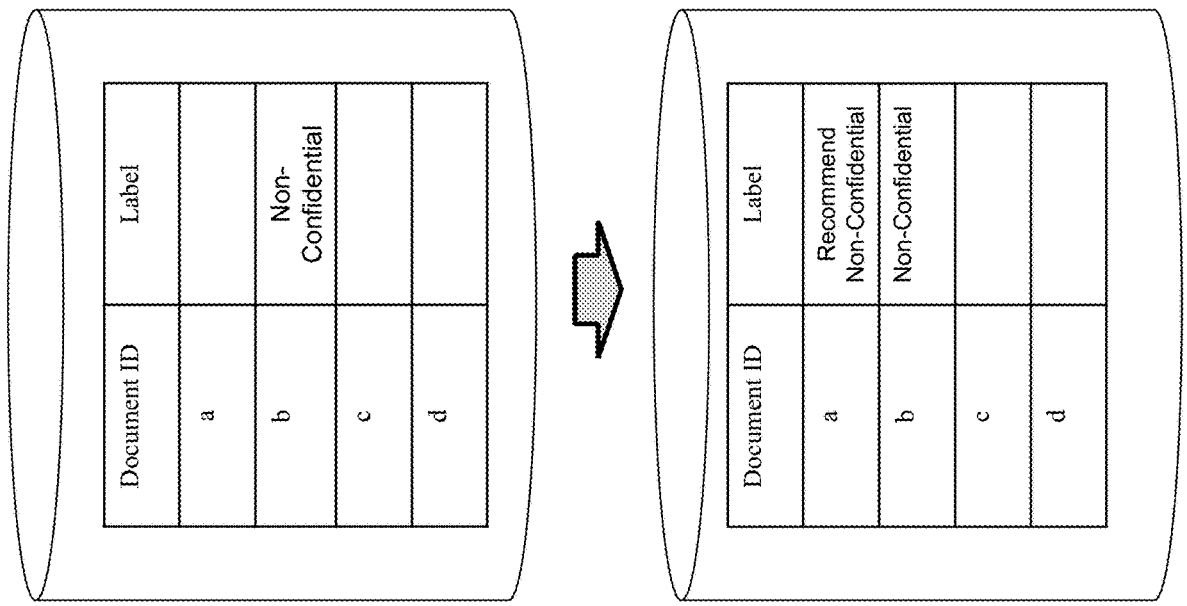
Figure 3:
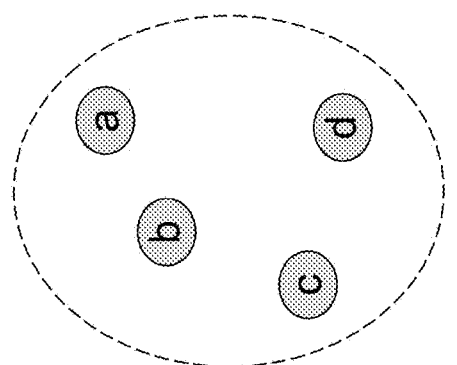
Figure 8C:
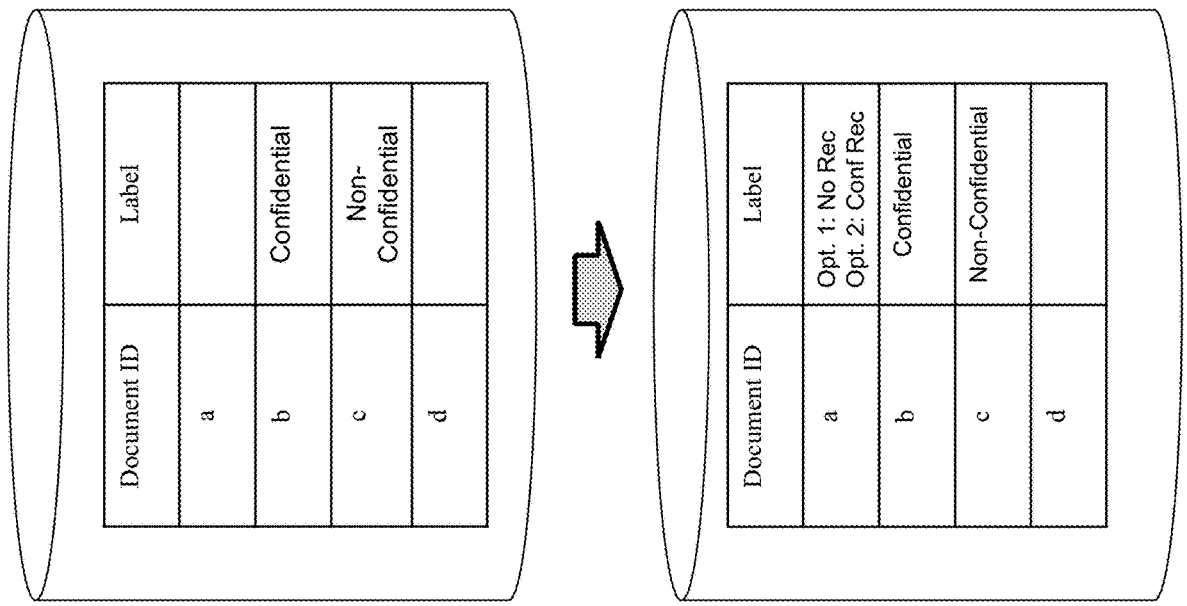

FIG. 8C-1 illustrates the situation when none of the neighbor documents b, c, or d are already labelled. In this situation, no recommendation can be provided for document a.

FIG. 8C-2 illustrates another situation when two of the neighbor documents are already labelled. Here, documents b and c already have the label "Confidential". Therefore, in this situation, a recommendation can be provided for document a to also be "Confidential".

FIG. 8C-3 illustrates an alternate situation when one of the neighbor documents is already labelled. Here, even though there is no majority of neighbors that have been labeled, at least one neighbor (document b) does already have the label "Non-Confidential". Therefore, in this situation, a recommendation can be provided for document a to also be "Non-Confidential".

Figure 4:
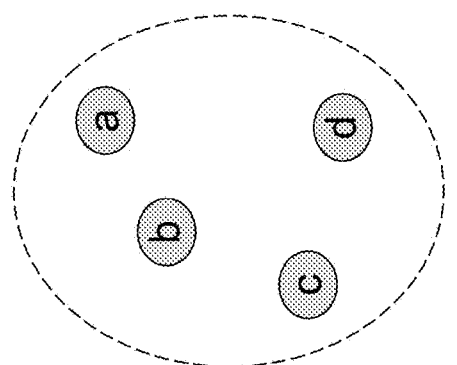

FIG. 8C-4 illustrates yet another situation where there is a conflict between the neighbor labels. Here, document b has the label "Confidential" while document c has the label "Non-Confidential". There are a number of different ways to handle this situation. One way is to note the existence of a conflict for the neighbor labels and to therefore not provide a recommendation. Another approach is to determine which of the labelled neighbor nodes have the closest distance to the node under examination, and to provide a recommendation on that distance. In this situation, as between node b and node c, node b is closer in distance to node a. Therefore, on a distance basis, a recommendation can be provided for document a to be labelled "Confidential" same as node b.

It is noted that the invention can be applied to perform both automatic classification labelling and generation of recommendations. With automatic classification labelling, the documents can be automatically tagged with the appropriate label. This may occur, for example, when the system achieves a certain confidence/accuracy threshold with the recommended labelling. Alternatively, the system can be limited only to provide recommendations that can be accepted or not by the user.

Illustrative Embodiment

Figure 9A:
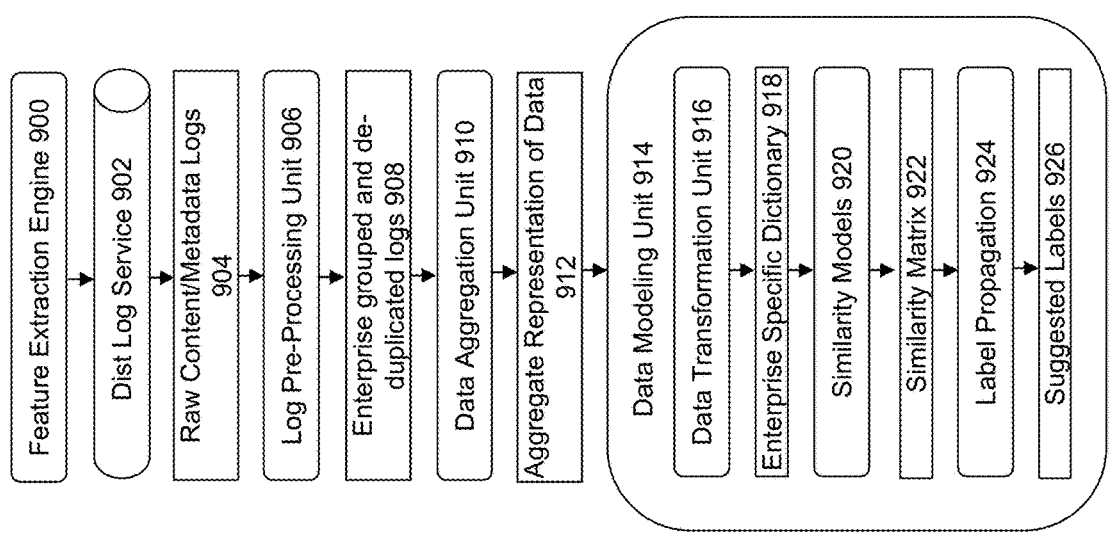
FIG. 9A provides a diagram of an illustrative data processing unit for a machine learning framework according to some embodiments of the invention.
Figures 1, 9B:
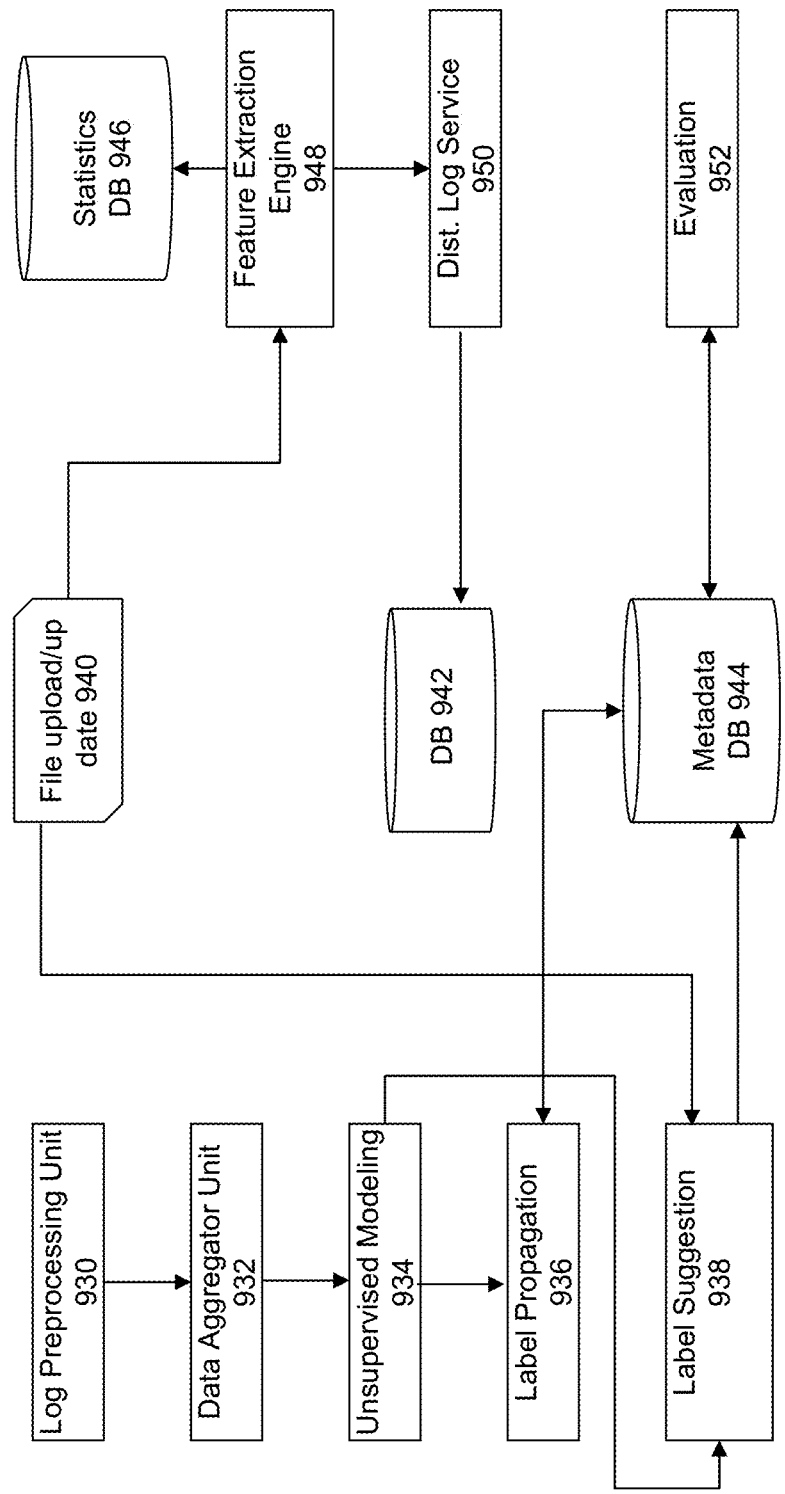
Figures 2, 9B:
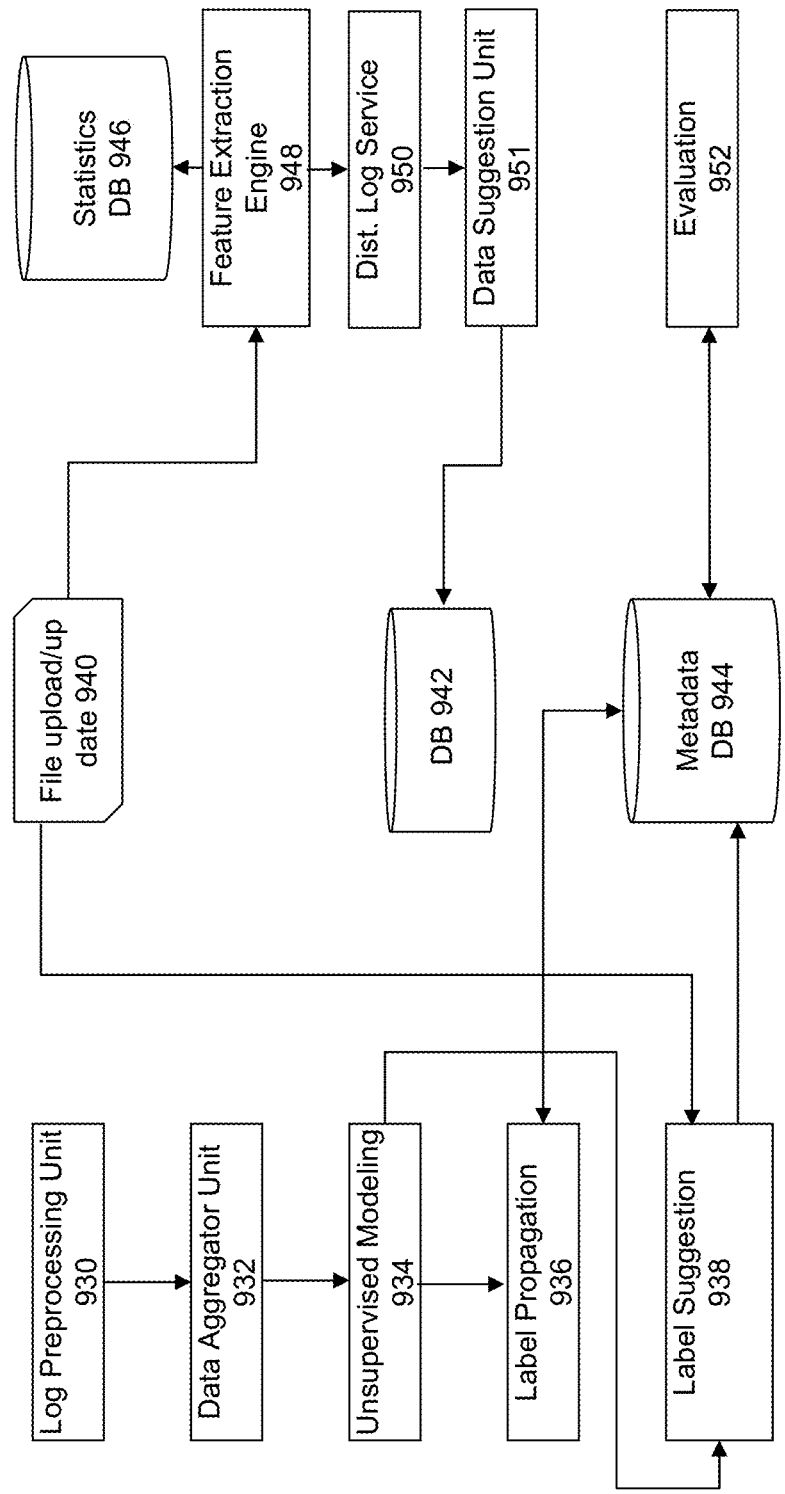

FIGS. 9A and 9B-1/9B-2 provide diagrams of illustrative data processing flows and processing units for a machine learning framework according to some embodiments of the invention. Different portions of the flow/system may be separately and/or collectively discussed in the below description of these two diagrams.

For FIG. 9A, the assumption is that at this point, the data to be processed is sitting in a datastore (e.g., a datastore implemented using HDFS (Hadoop distributed file system)). One possible use case of this architecture is data classification to classify data into categories of confidentiality to prevent data leakage. A feature extraction unit 900 operates to perform feature extraction, e.g., as described above. The result from performing feature extraction are stored into, for example, a distributed log service 902. Thereafter raw content and/or metadata logs 904 are provided to the data processing flow/system.

The data processing flow/system of FIG. 9A can be broken down into three major parts: (a) log preprocessing unit 906; (b) data aggregation unit 910; and (c) data modeling unit 914. In brief, the log preprocessing unit 906 may be used to implement enterprise grouped and de-duplicated logs 908. In some embodiments, separate data and metadata logs may be generated. This unit may append to an hourly incremental datastore and/or maintain an aggregate datastore directory. In brief, the data aggregation unit 910 generates aggregate representations of data 912. For example, convenience classes may be generated for accessing data (e.g., accounts for incremental versioning, duplication, and keeping track of the latest snapshot of the collection of documents in an enterprise). In brief, the data modeling unit 914 includes a data transformation unit 916 to perform data transformations, resulting in transformed data being placed into an enterprise specific dictionary 918. Similarity models 920 are employed to implement a similarity matrix 922. Thereafter, label propagation 924 is implemented to generate suggested labels 926

The responsibility of the preprocessing unit is primarily to aggregate logs of metadata and content data generated by the feature extraction worker entities (hereinafter referred to without limitation as a "tf-worker") onto a more convenient data source grouped by enterprise. Each log entry written by the tf-worker includes both tf-vector and metadata for the document.

The preprocessor unit takes these logs and performs the following actions: (a) group by enterprise; (b) separate metadata and tf-vector; (c) append periodic (e.g., hourly) data on incremental HDFS directories and maintain aggregated (e.g., daily aggregated) representation in the datastore directories.

With regards to document metadata, tf-workers listen for document—receipt events and extracts both content related data and available metadata of the file. In some embodiments, the events may only carry a fraction of the file's metadata. In other embodiments, the full metadata for the document will be incorporated.

With regards to an enterprise group, the machine learning models will run on enterprise specific datasets. In certain approaches, it may be advantageous to group data by enterprise. If there is a desire to store file data (tf-vectors) and metadata strictly on separate datastore directories, the system may run into a "small files problem". To get around the small files problem, the system can perform per-enterprise grouping. In this case, an enterprise identifier will be the key and the value will be all the entries of that enterprise.

In some embodiments, computation on the metadata and the actual data content can be performed differently. Additionally, one may wish to extract more types of information from files. The metadata and file content data can be stored in separate datastore directories to maintain clean homogenous datasets.

With regards to frequency of data and metadata updates, since some datastores are append only, one may not want to update the document's data or metadata on the datastore for every event. On the other hand, it may also not be desirable to leave a forever growing log that needs to be processed for old versions, metadata changes, etc. To address this issue, the data aggregation unit is implemented. In some embodiments, the log-preprocessing unit, executes periodically (e.g., every two hours) and the data aggregation unit executes on an aggregation period (e.g., every day). In light of this, the system can maintain incremental and aggregated sets of data/metadata. The following action may be performed: (a) new data written by the tf-vector is pre-processed and appended every time period (e.g., two hours) to a separate incremental datastore directory; (b) at the end of a longer time period, e.g., at the end of the day, the day's incremental directory will be merged onto a daily "aggregated" datastore directory. Merging is implemented by resolving file version changes, metadata changes and/or data content changes to ensure that the aggregated data reflects the latest (as of that day) snapshot of all the documents.

From an implementation point of view for certain embodiments, MR (map reduce) jobs can be written to perform the responsibilities of the preprocessing unit described above. The preprocessing job will be triggered by a workflow job that listens for new logs written by tf-worker. If new data is written, incremental jobs will run every two hours. Aggregation mode will run once every day and can also be triggered.

The data aggregation unit also provides convenience classes to access the aggregate snapshot of the collection of documents grouped for each enterprise. Whenever a request is made to the data aggregation unit, the most up to date file data and metadata should be returned.

Regarding changes in metadata or data content, only the latest version of the document will be considered in some embodiments. This means that the convenience classes discussed earlier should give the data for the latest version of the file that accounts for changes in both metadata and data. This can be done efficiently in at least two ways: (a) as described earlier, at the end of the day the preprocessing unit cleans up the aggregated data and writes in a centralized enterprise partitioned location—this cleanup process will also include ensuring that the files in the aggregated store are of the latest version; and/or (b) this leaves the system with the new file versions written by the tf-workers during the day, which will be accounted for by an MR (map-reduce) job that implements the filter on every call to the data access unit.

In some embodiments, the data modeling unit comprises three main subunits, including data transformation, similarity models, and label propagation.

Regarding data transformation, after the logs have been cleaned up and aggregated by the log-preprocessing unit and the data aggregation unit, the data is transformed in the form that may be valuable when building models. This may include, for example, (1) enterprise specific dictionary—a dictionary per enterprise that contains all the words present in that enterprise; and/or (2) enterprise specific document frequency—a count of the number of documents that contain each term (the "idf" part of tf-idf).

Regarding similarity models, a similarity matrix can be implemented to make predictions. For example, using the tf-idf vector representation of each document, the system will compute its similarity with every other document in the enterprise. There are many ways to implement this, with some examples including Jaccard, Cosine Euclidean, and RBF (radial basis function) approaches. The methods basically compute for the distance between two document-vectors in different ways (and accounting for different biases). The cosine similarity of document vectors A and B in some embodiments is expressed as:

$$\text{Sim}(A,B)=\cos(\theta)=A*B/\|A\|\|B\|$$

Some embodiments will also compute similarity based on file metadata where this approach uses co-occurrence of fields to determine the similarity. In some embodiments, the output of the models will be written to one or more datastores/databases, for bookkeeping, and/or for real time access.

The system can also perform post-processing for different use cases to give different weights to different distances to compute the final similarity based on use case. For example, in case of recommendations one might give higher weightage to similarity based on metadata to give more relevant recommendations.

The final output will be a document-by-document matrix that contains the similarity of each document with every other document. The similarity matrix will be stored in the datastore. Each entry will comprise a document_id and its similarity with every other document ({doc_id:231, {<id>=<similarity score>}}).

Regarding label propagation, this unit is responsible for integrating modeling unit with metadata. Some embodiments distinguish between tags added by user and the ones suggested by modeling units. In certain embodiments, a property template can be used with certain tags. For example, the two confidentiality levels tagged by the user will be: (a) Classification_Confidential_Confirmed; (b) Classification_NonConfidential_Confirmed. The two confidentiality levels tagged by the modeling unit will be: (a) Classification_Confidential_Suggested; (b) Classification_NonConfidential_Suggested.

Once the similarity matrix has been computed, a module will use a metadata API to obtain all of the file IDs for which the different confirmed confidential labels have been set. Once the system populates the file IDs in the above-described four categories, the system can use the similarity matrixes to compute the suggested tags for more unlabeled files. One can then set these suggested tags to the files using Metadata APIs.

FIG. 9B-1 provides a diagram of some components of an illustrative system according to some embodiments of the invention. The content-analysis pipeline is built so that files 940 that are uploaded/updated are text-extracted and the contents dumped into logs. The content analysis and the analytics pipeline ensure that each newly updated/uploaded file is available. A feature extraction engine 948 performs feature extraction and stores processing results in a distributed log service 950 (which may employ a database (DB) 942). The tf-worker uses a global dictionary sitting in a statistics DB 946 so that the tf-vectors contain only termIDs. These logs are then picked up by the analytics pipeline and dumped to the datastore. In the alternative embodiment of FIG. 9B-2, an additional data suggestion unit 951 may be employed, which may comprise part or all of a rules-based engine that suggests labels.

The data dumped into the datastore goes through two major steps before being ready for use by the modeling unit. Pre-processing of the logs is performed to extract and separate out the features (with a log pre-processing unit 930 using the process flow as discussed above). This unit 930 reads the log files every two hours and creates enterprise-wise grouping of the term frequency vector(s) and the file metadata.

In addition, higher-level aggregations are built from the preprocessed data (as discussed above, this is the responsibility of the data aggregation unit 932). This module builds higher-level constructs from the preprocessed data. First, it converts from a global dictionary to a local dictionary for each enterprise and maps the tf-vectors into the local dictionary. Next using this dictionary, this module maps the changes that have taken place to the corpus during the last 24 hours, and an aggregate representation of the corpus is built.

The unsupervised modeling unit 934 computes the document-to-document similarity matrix, and then selects the top R files for each file. This module computes the document-to-document similarity rankings with the top R files for each file.

There are two components that deal with labeling: (a) the label propagation unit 936; and (b) the label suggestion unit 938. The label propagation unit 936 takes the confirmed labels from the metadata for the files and propagates these labels to the neighbors of these files as suggested labels. At the end of the day, based on the similarity rankings and the confirmed labels (e.g., within the metadata DB 944), this module propagates the labels to the neighbors as suggested labels which are persisted in the metadata DB 944. The label suggestion unit 938 ensures that a newly uploaded/updated file has a suggested tag to it. This is the real-time component of the data modeling unit. This unit suggests labels for newly uploaded/updated files based on its content and metadata and persists these suggestions in the metadata DB 944. Evaluations may be provided for the labels by evaluation unit 952, e.g., based upon user evaluation and/or suggestions for the labels. User evaluation of proposed labels and user-provided labels can be used to confirm labels within the system.

Regarding unsupervised modeling, the model may not be using any labels in computing the similarity rankings. There are two components to the similarity matrix computed between documents: a) Term Frequency based b) Metadata based. The Unsupervised Modeling unit uses the aggregate representations of the corpus for each enterprise that has been calculated. This includes the term-frequency, metadata, the document—frequency and the corpus-level metadata like a) N—the number of documents in the enterprise and b) V—the number of terms in the dictionary.

The following are five possible approaches to building these similarities: (1) Model 1: tf-idf based model with various similarity metrics+K nearest neighbor; (2) Model 2: Unigram with KL Divergence+K nearest neighbors; (3) Model 3: Clustering (experiment with k-means, hierarchical, C3M); (4) Model 4: Clustering+Unigram+KL Divergence+K nearest neighbor; and/or (5) Model 5: Augmentation using a lexical dictionary (e.g., WORDNET) plus any of the previous models, where the global WORDNET in the form of an RDD[termID, Seq[termID]] as the inputModel.

Similarity between two files can also be established based on the following example metadata fields: (a) folder based similarity (two files in the same folders); (b) filename based similarity (two files have similar file names); and/or (c) user based similarity (two files are owned by the same person or modified by or created by the same person).

One can combine the similarity ranking/scores that are obtained from the two models by using a smoothing parameter (e.g., \lambda in (0,1) range). In some embodiments, the approach ensures that the two scores are in the same scale (0,1) and are well represented in that scale.

The label propagation unit propagates labels of files to its neighbors. Different strategies can be used to vote or resolve conflicts in case the neighbors of a file have conflicting labels.

The goal of the label suggestion module is to suggest new labels for files that are uploaded/updated. One possible version is an application that runs every two hours, after the log-preprocessing unit has run. The enterprise-specific processing module will be used to map the global tf-vectors to local-tf-vectors and similarity computed using the unsupervised learning module. The similarities are then used to make suggestions and update the metadata DB with these suggested tags. In some other embodiments, one might make it a streaming application or a service sitting in the content workflow worker and have a call back to the web-app to display the suggestion to the user almost instantaneously.

Therefore, what has been described is an improved approach to implement auto-classification of documents using a machine learning framework. This approach provides a very efficient way to classify documents, without the drawbacks associated with prior art classifiers. In addition, the inventive concept can perform propagation of labels associated with certain documents to other similar documents.

Another benefit of the current approach is that it addresses any security concerns by the owners of the documents. Since the final product corresponds to an encoded version of the original document, it will be difficult—if not impossible—for any person with access to the analysis results to re-create the original source documents.

System Architecture Overview

Figure 10:
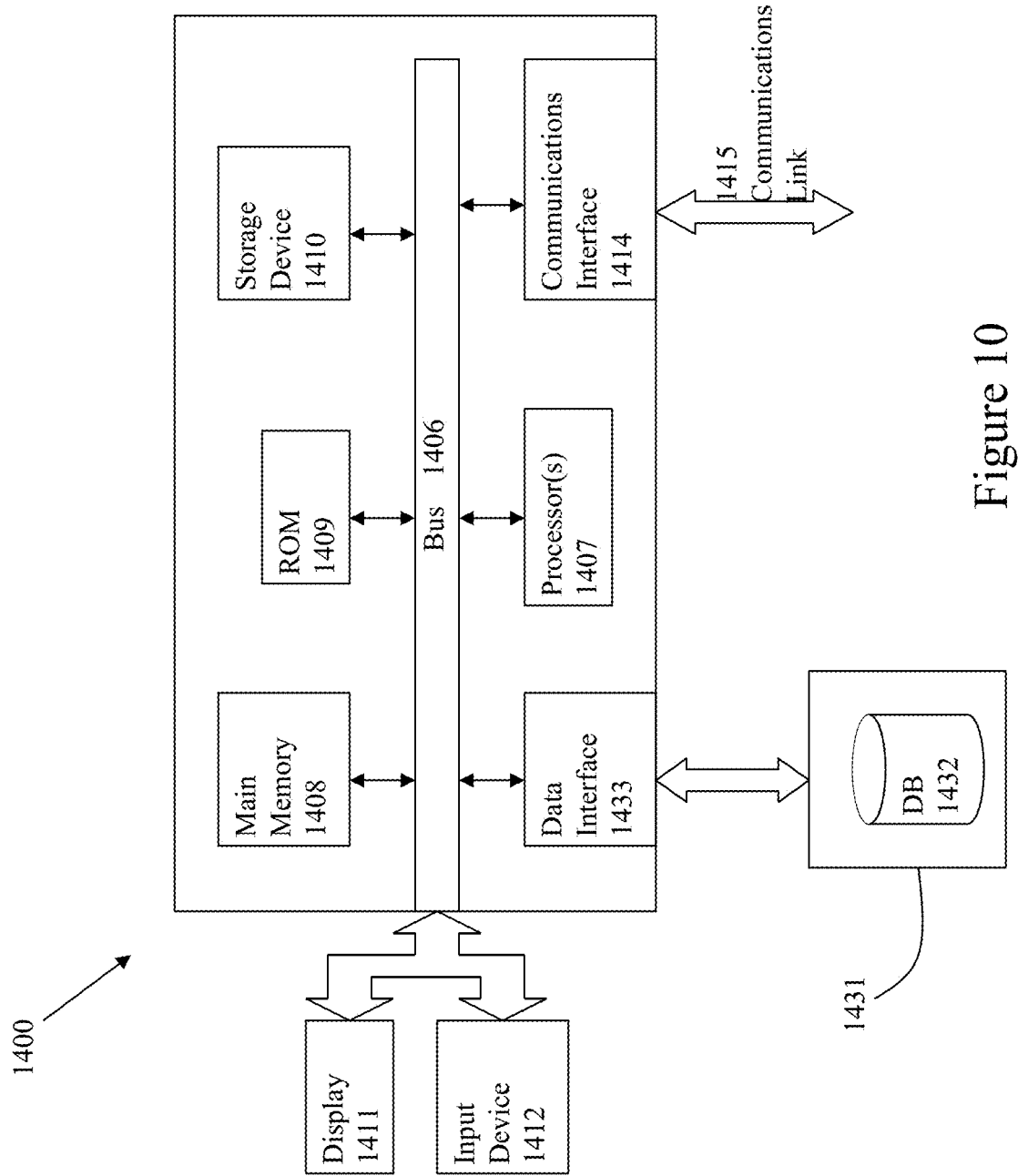
FIG. 10 shows an architecture of an example computing system with which the invention may be implemented.

FIG. 10 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed from a database 1432 that is maintained in a storage device 1431, which is accessed using data interface 1433.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A computer implemented method for analyzing data, comprising:

receiving a plurality of documents for storage in a document repository of a cloud-based storage system, wherein received documents of the plurality of documents are stored in the document repository of the cloud-based storage system;

generating an event for each document of the received documents;

storing work for each document of the received documents in a queue;

dispatching work corresponding to respective events from the queue to initiate processing of a corresponding received document at a feature extraction engine by:
processing the corresponding received document to generate a respective feature vector, and
storing the respective feature vector in a log file;

triggering, on a periodic time interval, the processing of the log file having a plurality of feature vectors corresponding to each document of the plurality of documents by processing data in the log file to perform at least one of (a) grouping of the data in the log file by enterprise; (b) separating metadata in the data of the log file from feature vector data in the data of the log file; (c) appending data in the log file to an incremental dataset; or (d) aggregating data of the log file and maintaining an aggregated representation of the data in the log file in a datastore directory; and classifying respective documents of the plurality of documents by at least analyzing similarities between documents to perform label propagation, wherein label propagation comprises:
identifying one or more neighbor documents based at least in part on previously generated feature vector for the respective document and feature vectors for previously classified documents,
identifying one or more label values for the one or more neighbor documents,
providing a recommendation of a label value for the respective document, and
assigning the label value to the respective document.

2. The method of claim 1, wherein identifying the one or more neighbor documents is performed by at least determining a distance between the previously generated feature vector for the respective document and feature vectors for previously classified documents.

3. The method of claim 1, wherein feature vectors comprise term frequency vectors.

4. The method of claim 1, wherein one or more feature extraction worker processes in the cloud-based storage system write log entries comprising the metadata and the feature vectors data in the log file, and appending data in the log file to an incremental dataset occurs at a first periodic interval and aggregating data of the log file and maintaining an aggregated representation of the data in the log file in a datastore directory occurs at a second periodic interval, wherein the second periodic interval is greater than the first periodic interval.

5. The method of claim 1, wherein clustering is employed to perform the classification of the documents.

6. The method of claim 1, wherein a similarity matrix is used to classify the documents.

7. The method of claim 1, wherein feature vectors are generated based on a tokenization of corresponding documents using an enterprise specific dictionary and the feature vectors specify a frequency of occurrence of terms within the document.

8. The method of claim 1, wherein the label value recommended is determined based at least in part on a majority of the one or more neighbor documents having the label value.

9. The method of claim 1, wherein no recommended label is provided when there is no majority of the one or more neighbor documents having a certain label value.

10. The method of claim 1, wherein the recommended label is a label that was previously accepted by a user.

11. The method of claim 1, wherein a conflict resolution process selects a label value associated with a neighbor document that has a closest distance to the document.

12. A system, comprising:
a memory storing a set of instructions;
a processor that executes the set of instructions to cause a set of acts comprising:
receiving a plurality of documents for storage in a document repository of a cloud-based storage system, wherein received documents of the plurality of documents are stored in the document repository of the cloud-based storage system;
generating an event for each document of the received documents;
storing work for each document of the received documents a queue;
dispatching work corresponding to respective events from the queue to initiate processing of a corresponding received document at a feature extraction engine by:
processing the corresponding received document to generate a respective feature vector, and
storing the respective feature vector in a log file;
triggering, on a periodic time interval, the processing of the log file having a plurality of feature vectors corresponding to each document of the plurality of documents by processing data in the log file to perform at least one of (a) grouping of the data in the log file by enterprise; (b) separating metadata in the data of the log file from feature vector data in the data of the log file; (c) appending data in the log file to an incremental dataset; or (d) aggregating data of the log file and maintaining an aggregated representation of the data in the log file in a datastore directory; and
classifying respective documents of the plurality of documents by at least analyzing similarities between documents to perform label propagation, wherein label propagation comprises:
identifying one or more neighbor documents based at least in part on previously generated feature vector for the respective document and feature vectors for previously classified documents,
identifying one or more label values for the one or more neighbor documents,
providing a recommendation of a label value for the respective document, and
assigning the label value to the respective document.

13. The system of claim 12, wherein feature vectors comprise term frequency vectors.

14. The system of claim 12, wherein one or more feature extraction worker processes in the cloud-based storage system write log entries comprising the metadata and the feature vectors data in the log file, and appending data in the log file to an incremental dataset occurs at a first periodic interval and aggregating data of the log file and maintaining an aggregated representation of the data in the log file in a datastore directory occurs at a second periodic interval, wherein the second periodic interval is greater than the first periodic interval.

15. The system of claim 12, wherein clustering is employed to perform the classification of the documents.

16. The system of claim 12, wherein a similarity matrix is used to classify the documents.

17. The system of claim 12, wherein feature vectors are generated based on a tokenization of corresponding documents using an enterprise specific dictionary and the feature vectors specify a frequency of occurrence of terms within the document.

18. The system of claim 12, wherein the label value recommended is determined based at least in part on a majority of the one or more neighbor documents having the label value.

19. The system of claim 12, wherein no recommended label is provided when there is no majority of the one or more neighbor documents having a certain label value.

20. The system of claim 12, wherein the recommended label is a label that was previously accepted by a user.

21. The system of claim 12, wherein a conflict resolution process selects a label value associated with a neighbor document that has a closest distance to the document.

22. A computer program product embodied on a non-transitory computer usable medium having stored thereon a sequence of instructions which, when executed by a processor as set of acts comprising:
receiving a plurality of documents for storage in a document repository of a cloud-based storage system, wherein received documents of the plurality of documents are stored in the document repository of the cloud-based storage system;
generating an event for each document of the received documents;
storing work for each document of the received documents in a queue;
dispatching work corresponding to respective events from the queue to initiate processing of a corresponding received document at a feature extraction engine by:
processing the corresponding received document to generate a respective feature vector, and
storing the respective feature vector in a log file;
triggering, on a periodic time interval, the processing of the log file having a plurality of feature vectors corresponding to each document of the plurality of documents by processing data in the log file to perform at least one of (a) grouping of the data in the log file by enterprise; (b) separating metadata in the data of the log file from feature vector data in the data of the log file; (c) appending data in the log file to an incremental dataset; or (d) aggregating data of the log file and maintaining an aggregated representation of the data in the log file in a datastore directory; and classifying respective documents of the plurality of documents by at least analyzing similarities between documents to perform label propagation, wherein label propagation comprises:

identifying one or more neighbor documents based at least in part on previously generated feature vector for the respective document and feature vectors for previously classified documents, identifying one or more label values for the one or more neighbor documents, providing a recommendation of a label value for the respective document, and assigning the label value to the respective document.

23. The computer program product of claim 22, wherein feature vectors comprise term frequency vectors.

24. The computer program product of claim 22, wherein one or more feature extraction worker processes in the cloud-based storage system write log entries comprising the metadata and the feature vectors data in the log file, and appending data in the log file to an incremental dataset occurs at a first periodic interval and aggregating data of the log file and maintaining an aggregated representation of the data in the log file in a datastore directory occurs at a second periodic interval, wherein the second periodic interval is greater than the first periodic interval.

25. The computer program product of claim 22, wherein clustering is employed to perform the classification of the documents.

26. The computer program product of claim 22, wherein a similarity matrix is used to classify the documents.

27. The computer program product of claim 22, wherein feature vectors are generated based on a tokenization of corresponding documents using an enterprise specific dictionary and the feature vectors specify a frequency of occurrence of terms within the document.

28. The computer program product of claim 22, wherein the label value recommended is determined based at least in part on a majority of the one or more neighbor documents having the label value.

29. The computer program product of claim 22, wherein no recommended label is provided when there is no majority of the one or more neighbor documents having a certain label value.

30. The computer program product of claim 22, wherein the recommended label is a label that was previously accepted by a user.

31. The computer program product of claim 22, wherein a conflict resolution process selects a label value associated with a neighbor document that has a closest distance to the document.

* * * * *